Patented Apr. 21, 1942

2,280,497

UNITED STATES PATENT OFFICE 2,280,497

CYCLIC SULPHONIC ACID AMIDE COMPOUNDS

Fritz Mietzsch and Josef Klarer, Wuppertal-Elberfeld, Germany, assignors to Winthrop Chemical Company, Inc., New York, N. Y., a corporation of New York No Drawing. Application July 28, 1938, Serial No. 221,713. In Germany August 4, 1937

3 Claims. (Cl. 260—397.7)

This invention relates to cyclic sulphonic acid amide compounds.

In accordance with the present invention compounds which are highly efficacious against infectious diseases are obtained by preparing derivatives of cyclic diamines which contain benzene sulphonyl radicals in the two nuclear amino groups the para-positions of which radicals are connected with the nitrogen atoms of nitrogenous groups. As cyclic diamines the diamines of mono- or polynuclear aromatic compounds, such as diaminobenzenes, diaminonaphthalenes and the like come into consideration. In the polynuclear ring systems the amino groups may be attached to the same or two different rings. The cyclic diamines may also be derived from compounds in which two aromatic radicals are directly and/or indirectly connected with one another, for instance by a radical containing carbon, nitrogen, oxygen or sulphur. Compounds of the said kind are, for instance, diaminodiphenyls, diaminodiphenylmethanes, diaminodiphenylketones, diaminodiphenylethers, diaminodiphenylene oxides, diaminodiphenyl sulphides and diaminodiphenyl sulphones or diaminodiphenylene sulphones. The aromatic nuclei of the diamines may contain further substituents besides the amino groups, for instance alkyl, hydroxy, alkoxy, halogen and nitro groups. Acid groups, such as sulphonic acid and carboxylic acid groups, as nuclear substituents, have, however, an unfavorable influence on the efficacy of the compounds and for this reason should not be present. As benzenesulphonyl radicals the para-positions of which are connected with the nitrogen atoms of nitrogenous groups, in particular the radicals of 4-nitro-, 4-amino-, 4-alkylamino- and 4-acylaminobenzene sulphonic acids come into consideration. Suitable acyl radicals are, for instance, the acetyl, formyl, propionyl and butyryl radical.

Accordingly, the present invention refers to new anti-infectious products represented by the following general formula:

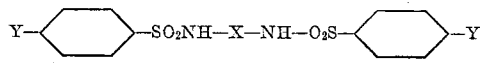

wherein X stands for a cyclic radical containing no acid group selected from the group consisting of phenylene radicals, naphthalene radicals and radicals containing two benzene nuclei selected from the group consisting of diphenyl, diphenylmethane, diphenylketone, diphenyloxide, diphenyleneoxide, diphenylsulphide, diphenylamine, diphenylenesulphone and diphenylsulphone radicals, and Y stands for a nitrogen group selected from the group consisting of nitro, amino, alkyl- and acylamino groups.

The compounds of the above specified kind have proved to be efficacious in bacterial infectious diseases. A specific action has been observed in combating streptococci and staphylococci or spirillae infections. For combating the latter, those compounds have proved to be particularly suitable in which the two nuclear amino groups of the diamines are in para-position to one another or to the connecting places of the cyclic radicals, as for instance, 1.4-bis-(4'-nitrobenzene-sulphonamido)-benzene.

The process of manufacture of the specified compounds according to the invention consists in introducing into the two amino groups of cyclic diamines, by the action of benzene sulphonic acids or their reactive derivatives, such as halides and esters, the para-position of which is connected with the nitrogen atom of a nitrogenous group, the radical of these sulphonic acids, or in reacting benzene sulphonic acid amides, the para-position of which is connected with the nitrogen atom of a nitrogenous group, with cyclic compounds which contain two groups capable of being replaced by these benzene sulphonic acid amide radicals. The reaction is preferably carried out in the presence of acid-binding agents. Primary or secondary amino groups in the para-positions of the benzene sulphonyl radicals are protected, for instance by acylation, during the reaction. In the reactions set forth the two radicals may also be caused to react in stages. When using benzene sulphonic acid radicals with different nitrogenous groups also unsymmetrically constructed compounds may be prepared.

The reactions can also be carried out with compounds which instead of the necessary nitrogeneous groups in para-position of the benzene sulphonic acid derivatives contain substituents capable of being converted into these nitrogenous groups, this conversion reaction being subsequently performed. In this manner it is also possible to obtain some of these nitrogenous groups from others, such as for instance amino groups from nitro or azo groups by reduction, or from azo methine groups by hydrolysis, or from acylamino groups by saponification.

The invention is further illustrated by the following examples without being restricted thereto:

*Example 1.*—10.8 grams of 1.3-phenylenediamine are dissolved in 60 ccs. of pyridine. The solution is gradually treated with 47 grams of 4-acetylaminobenzenesulphonic acid chloride while externally cooling. The reaction mixture is then heated on the boiling water bath for one hour, cooled and poured into a mixture of 250 ccs. of concentrated hydrochloric acid, 250 ccs. of water and ice, while stirring. The separated 1.3-bis-(4'-acetylaminobenzenesulphonamido)-benzene is filtered with suction, washed and purified by dissolving in dilute caustic soda solution in the cold, treatment with animal charcoal, filtering and reprecipitating with dilute hydrochloric acid. By dissolving in boiling acetone and treatment with water the product is obtained in crystals which melt at 289–290° C. with decomposition.

For saponifying the acetyl groups, the acetyl compound is introduced into a boiling mixture of 75 ccs. of concentrated caustic soda solution and 75 ccs. of water and boiled under reflux for one hour. On precipitation with dilute acetic acid the 1.3-bis-(4'-aminobenzenesulphonamido)-benzene is obtained which by dissolving in boiling 90% alcohol and treating with water forms crystals melting at 215–217° C. with foaming.

When using instead of 1.3-phenylenediamine the same quantity of 1.4-phenylenediamine, the 1.4-bis-(4'-acetylaminobenzene-sulphonamido)-benzene is obtained which after reprecipitation from caustic soda solution with hydrochloric acid does not melt up to 300° C. and the 1.4-bis-(4'-aminobenzene-sulphonamido)-benzene which is obtained after dissolving in boiling 70% alcohol and diluting with water in the form of white crystals melting at 273–274° C. with decomposition. The crystals dissolve in a large quantity of warm dilute hydrochloric acid.

In an analogous manner the 2.5-dimethoxy-1.4-bis-(4'-aminobenzene-sulphonamido)-benzene may be obtained by reprecipitation from caustic soda solution with acetic acid in the form of weak violet colored crystals melting at 288° C. and the 2-methoxy-5-methyl-1.4-bis-(4'-amino-benzene-sulphonamido)-benzene by reprecipitation from caustic soda solution with acetic acid in the form of pure white crystals melting at about 300° C.

10.8 grams of 1.4-phenylenediamine are treated in 60 ccs. of pyridine with 45 grams of 4-nitro-benzene-sulphonic acid chloride. On pouring the reaction mixture into cold dilute hydrochloric acid the 1.4-bis-(4'-nitro-benzene-sulphonamido)-benzene is separated. After recrystallizing from acetone and water it is obtained in almost colorless crystals melting at 284° C. (with decomposition). It dissolves in dilute caustic soda solution with a brownish yellow coloration and is again precipitated by dilute acetic acid.

*Example 2.*—23.1 grams of the hydrochloric acid salt of 1.4-naphthylenediamine are dissolved in 100 ccs. of pyridine. The solution is treated with 47 grams of 4-acetylaminobenzene sulphonic acid chloride as indicated in Example 1, and the reaction product subsequently saponified. In this manner the 1.4-bis-(4'-aminobenzenesulphonamido)-naphthalene is obtained as a white crystal powder which readily turns red when exposed to light and which after reprecipitation from caustic soda solution with acetic acid, melts at 257° C. The substance is readily soluble in acetone.

When using the same quantity of the hydrochloric acid salt of 1.5-naphthylenediamine the 1.5-bis-(4'-aminobenzene-sulphonamido)-naphthalene melting at 285° C. after reprecipitation from caustic soda solution with acetic acid is obtained.

From 15.8 grams of 1.8-naphthylenediamine the 1.8-bis-(4'-aminobenzene-sulphonamido)-naphthalene can be obtained. After recrystallizing several times from 70% alcohol it is obtained in white crystals which turn violet when exposed to light and melt at 197° C. The substance is readily soluble in acetone. It dissolves in dilute cold caustic soda solution. By excess caustic soda solution the sodium salt is precipitated in beautiful crystals.

From 1.8-naphthylenediamine and 4-nitrobenzene sulphonic acid chloride the 1.8-bis-(4'-nitrobenzene-sulphonamido)-naphthalene is obtained. After dissolving in acetone and treating with water it is obtained in yellowish crystals melting at 272° C. It is soluble in hot dilute caustic soda solution with reddish-yellow coloration. On cooling, the readily soluble sodium salt precipitates in yellow felted needles.

From 2.6-naphthylenediamine and 4-acetylaminobenzene sulphonic acid chloride the 2.6-bis-(4'-aminobenzene-sulphonamido)-naphthalene is obtained after saponification of the acetyl compound first formed. After reprecipitation from caustic soda solution with acetic acid it forms white crystals which turn reddish when exposed to light and melt at 276° C. It is readily soluble in acetone.

*Example 3.*—18.4 grams of benzidine are dissolved in 250 ccs. of acetone and 20 ccs. of pyridine. The solution is treated with 47 grams of 4-acetylamino-benzene sulphonic acid chloride while stirring. After boiling for 2 hours the acetone is blown off with steam and the residue poured into 100 ccs. of concentrated hydrochloric acid and 300 ccs. of water while stirring. After filtering with suction and washing of the precipitate formed, the mixture is reprecipitated from caustic soda solution with hydrochloric acid as described above, and the product obtained saponified by boiling with 15% hydrochloric acid. The base which is set free from the hydrochloric acid solution, the 4.4'-bis-(4''-amino-benzene-sulphonamido)-diphenyl, is a white crystal powder melting at 288° C. which on prolonged standing in the light becomes discolored with a slight brownish coloration. It is readily soluble in caustic soda solution and soluble in a large quantity of hot dilute hydrochloric acid.

The 3.3'-dimethyl-4.4'-bis-(4''-aminobenzene-sulphonamido)-diphenyl which is obtained when using 21.2 grams of tolidine instead of benzidine may be recrystallized from 90% alcohol and melts at 231–233° C.

When using 24.6 grams of benzidine sulphone instead of the benzidine the 4.4'-bis-(4''-aminobenzene-sulphonamido)-diphenylene-sulphone is obtained after recrystallization from 90% alcohol, in the form of almost colorless crystals which at about 160° C. give off their crystal solvent, become solid and melt at 267–268° C. They dissolve in dilute caustic soda solution with a yellow coloration, in dilute hydrochloric acid without coloration.

*Example 4.*—24.8 grams of 4.4'-diaminodiphenyl-sulphone are dissolved in 100 ccs. of pyridine. The solution is gradually treated with 47 grams of 4-acetylaminobenzene sulphonic acid chloride and subsequently heated on the boiling water bath for one hour. Thereby the very red color first appearing after the sulphochloride has been added gradually changes to a brownish yellow coloration. By pouring the reaction mixture into 300 ccs. of concentrated hydrochloric acid, 300 ccs. of water and ice, while stirring, the 4.4'-bis-(4''-acetylaminobenzene-sulphonamido)-diphenylsulphone is separated. It is washed with dilute hydrochloric acid and water. By redissolving in caustic soda solution in which it dissolves with a brownish yellow coloration and precipitating with hydrochloric acid, it is obtained in weak reddish crystals containing much water of crystallization, which are freed from water in a drier by melting and are then recrystallized from dilute alcohol. After drying for a prolonged period at ordinary temperature under reduced pressure the substance thus purified melts at about 175° C. with foaming.

The 4.4'-bis-(4''-aminobenzene-sulphonamido)-diphenyl-sulphone formed by boiling with dilute caustic soda solution and precipitation with dilute acetic acid is an almost colorless powder which contains much water of crystallization and which starts to sinter at about 100° C. giving off the water of crystallization. It dissolves in dilute caustic soda solution with a brownish yellow coloration, it is colorless in dilute hydrochloric acid.

The 4.4'-bis-(4''-aminobenzene-sulphonamido)-diphenyl sulphide obtained in a corresponding manner from 4.4'-diamino-diphenyl sulphide forms after reprecipitation with dilute acetic acid an almost colorless crystal powder which after drying for a prolonged time at room temperature under reduced pressure melts at about 100° C. with foaming. As compared with the above described sulphone it dissolves in dilute caustic soda solution without coloration. Furthermore, it is readily soluble in alcohol, acetone and methanol.

When using 4-nitrobenzene sulphonic acid chloride instead of 4-acetylaminobenzene sulphonic acid chloride the 4.4'-bis-(4''-nitrobenzene-sulphonamido)-diphenyl sulphide is obtained. After precipitation with dilute acetic acid it forms a weak yellow crystal powder which dissolves in dilute caustic soda solution and sodium carbonate solution with a yellow coloration and sinters on drying in a steam closet with a brown coloration.

The 4.4'-bis-(4''-acetylaminobenzene-sulphonamido)-diphenylamine is obtained from 4.4'-diaminodiphenylamine and 4-acetylaminobenzene sulphonic acid chloride. After recrystallization from dilute alcohol it is obtained in faintly violet colored crystal needles melting at 157–158° C. with foaming. The 4.4'-bis-(4''-aminobenzene-sulphonamido)-diphenylamine obtained therefrom by saponification is precipitated with dilute acetic acid in the form of slightly violet crystals containing much water of crystallization which are readily soluble in alcohol, acetone and methanol.

From 4.4'-diamino-diphenylether and 4-acetylamino-benzene sulphonic acid chloride the 4.4'-bis-(4''-acetyl-aminobenzene-sulphonamido)-diphenylether is obtained as a white crystal powder which after complete dehydration melts at 150° C. By saponification the 4.4'-bis-(4''-aminobenzene-sulphonamido)-diphenylether is obtained therefrom in the form of weak reddish crystals containing a large amount of water which after complete drying sinter at 105° C. and melt at 115° C. The substance is readily soluble in dilute hydrochloric acid and dilute caustic soda solution.

From 4.4'-diaminodiphenylmethane and 4-acetylaminobenzene sulphonic acid chloride the 4.4'-bis-(4''-acetyl-aminobenzene sulphonamido)-diphenylmethane is obtained in yellowish white crystals which contain much water and melt after complete drying at 180° C. The 4.4'-bis-(4''-aminobenzene-sulphonamido)-diphenylmethane obtained therefrom by saponification forms after reprecipitating several times from alkaline solution with acetic acid a light yellow powder which after complete drying sinters at 100° C. and melts at about 150° C. The substance is readily soluble in caustic soda solution, hydrochloric acid, methanol and acetone.

From 4.4'-diaminobenzephenone the 4.4'-bis-(4''-acetylaminobenzene-sulphonamido)-benzophenone is obtained with acetylaminobenzene-sulphonic acid chloride in the form of orange yellow crystals melting at 140–145° C. The 4.4'-bis-(4''-aminobenzene-sulphonamido)-benzophenone obtained therefrom by saponification is a light yellow crystal powder which melts at 278° C. and is readily soluble in hydrochloric acid and caustic soda solution, difficultly soluble in alcohol.

*Example 5.*—55.8 grams of 4-nitrobenzene sulphonic acid phenylester are intimately mixed with 10.8 grams of 1.4-phenylenediamine and heated under reflux for 15 minutes. The cold reaction mixture is disintegrated and the phenol formed blown off with steam. The 1.4-bis-(4'-nitrobenzene-sulphonamido)-benzene is obtained from the residue by recrystallization from a small quantity of water-containing acetone. It melts at 284° C. (with decompos.)

The same compound is obtained by adding 53.2 grams of 4-nitrobenzene-sulphobromide to a cooled solution of 10.8 grams of 1.4-phenylenediamine in pyridine and treating the mixture as indicated in Example 1.

The 4-nitrobenzene sulphonic acid phenylester used as initial material is obtained by the action of an acetonic solution of 4-nitrobenzene sulphochloride upon the aqueous solution of the calculated quantity of sodium phenolate. After recrystallization from alcohol the product is obtained in weakly yellow colored crystals melting at 117° C.

The 4-nitrobenzene sulphobromide used as initial material is obtained by heating of 4-nitrobenzene sulphonic acid potassium with phosphorus pentabromide on the water bath. After recrystallization from acetone it is obtained in yellowish crystals melting at 85° C.

We claim:

1. The products of the formula:

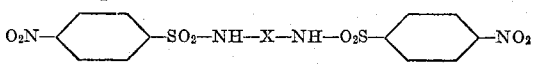

wherein X stands for a cyclic radical containing no acid group selected from the group consisting of phenylene radicals, naphthalene radicals and radicals containing two benzene nuclei selected from the group consisting of diphenyl, diphenylmethane, diphenylketone, diphenyloxide, diphenyleneoxide, diphenylsulphide, diphenylamine, diphenylenesulphone and diphenylsulphone radicals.

2. The products of the formula:

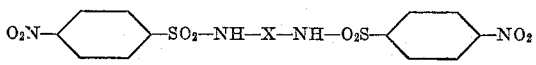

wherein X stands for a phenylene radical containing no acid group.

3. 1.4-bis-(4'-nitrobenzene-sulphonamido)-benzene which forms white crystals melting at 284° C. (with decomposition).

FRITZ MIETZSCH.
JOSEF KLARER.